United States Patent
Ohlsson (10) Patent No.: US 11,502,384 B2
(45) Date of Patent: Nov. 15, 2022

(54) MICROWAVE TRANSMISSION ARRANGEMENT COMPRISING A HOLLOW WAVEGUIDE HAVING DIFFERING CROSS-SECTIONAL AREAS COUPLED TO A CIRCUIT BOARD WITH A GROUND PLANE CIRCUMSCRIBED WITHIN THE HOLLOW WAVEGUIDE

(71) Applicant: Rosemount Tank Radar AB, Mölnlycke (SE)

(72) Inventor: Magnus Ohlsson, Norsholm (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 0 days.

(21) Appl. No.: 17/192,219

(22) Filed: Mar. 4, 2021

(65) Prior Publication Data
US 2021/0305673 A1 Sep. 30, 2021

(30) Foreign Application Priority Data
Mar. 26, 2020 (EP) ..................................... 20165990

(51) Int. Cl.
*H01P 5/107* (2006.01)
*H01P 3/12* (2006.01)
(Continued)

(52) U.S. Cl.
CPC ............ *H01P 5/107* (2013.01); *G01F 23/284* (2013.01); *H01P 3/121* (2013.01); *H01P 3/16* (2013.01); *H04B 3/52* (2013.01)

(58) Field of Classification Search
CPC .......... H01P 3/12; H01P 11/002; H01P 5/107; G01F 23/284
(Continued)

(56) References Cited

U.S. PATENT DOCUMENTS 6,822,528 B2 * 11/2004 Dawn et al. ............ H01P 5/107
 333/33
7,498,896 B2 * 3/2009 Shi .......................... H01P 5/107
 333/33
(Continued)

FOREIGN PATENT DOCUMENTS

CN 207303311 5/2018
JP 2012-49862 3/2012

OTHER PUBLICATIONS

Extended European Search Report from European Patent Application No. 20165990.1, dated Sep. 30, 2020.

*Primary Examiner* — Benny T Lee
(74) *Attorney, Agent, or Firm* — Westman, Champlin & Koehler, P.A.

(57) ABSTRACT

A microwave transmission arrangement, comprising an electrically conductive hollow waveguide having a first waveguide portion, a second waveguide portion between the first waveguide portion and a first end of the hollow waveguide, and a conductive transition surface of the hollow waveguide forming a transition between the first waveguide portion and the second waveguide portion; and a microwave circuit board including a dielectric carrier, and a first conductor pattern on a first side of the dielectric carrier, the first conductor pattern including a patch for radiating or receiving microwave signals in the predefined wavelength range, and a first ground plane surrounding the patch, wherein the first ground plane of the microwave circuit board is in conductive contact with the first end of the hollow waveguide, and extends into the second waveguide portion cross-section area to define at least one conductive pocket together with the second waveguide portion and the transition surface of the hollow waveguide.

12 Claims, 5 Drawing Sheets

(51) Int. Cl.
  *H01P 3/16*   (2006.01)
  *H04B 3/52*   (2006.01)
  *G01F 23/284* (2006.01)

(58) Field of Classification Search
  USPC .................................................. 333/248, 26
  See application file for complete search history.

(56) References Cited

U.S. PATENT DOCUMENTS

| | | |
|---|---|---|
| 2007/0026567 A1 | 2/2007 | Beer et al. |
| 2012/0153969 A1* | 6/2012 | Eckert et al. ........... G01S 7/032 |
| | | 324/637 |
| 2012/0176285 A1* | 7/2012 | Morgia .................. H01P 5/107 |
| | | 343/772 |
| 2014/0007674 A1 | 1/2014 | Weinzierle et al. |
| 2014/0333389 A1 | 11/2014 | Milyakh et al. |
| 2017/0201028 A1 | 7/2017 | Eberhardt et al. |
| 2018/0287264 A1 | 10/2018 | Walde et al. |

* cited by examiner

MICROWAVE TRANSMISSION ARRANGEMENT COMPRISING A HOLLOW WAVEGUIDE HAVING DIFFERING CROSS-SECTIONAL AREAS COUPLED TO A CIRCUIT BOARD WITH A GROUND PLANE CIRCUMSCRIBED WITHIN THE HOLLOW WAVEGUIDE

CROSS-REFERENCE TO RELATED APPLICATION

This application claims priority to European Patent Application No. 20165990.1, filed Mar. 26, 2020, the content of which is hereby incorporated by reference in its entirety.

TECHNICAL FIELD OF THE INVENTION

The present invention relates to a microwave transmission arrangement, to a communication and/or measurement system and to a radar level gauge system.

TECHNICAL BACKGROUND

For the transmission of high-frequency microwaves from and to microwave transceiver circuitry, it is known to use a transition from a microwave circuit board to an electrically conductive hollow waveguide. Such a transition may be realized with a so-called quarter-wave back-short, but this may, in particular for relatively high frequencies, make it more difficult to integrate the microwave circuit board with a lower-frequency circuit board for accommodating other electronics, such as signal processing circuitry.

Therefore, solutions have been presented that do not require a quarter-wave back-short, but in which the microwave coupling to the waveguide is carried out using a patch and a ground plane at least partly surrounding the patch.

It would be desirable to provide this kind of microwave coupling in a way that is suitable for use in environments with potentially explosive atmospheres, that are subject to so-called "EX-restrictions", in particular related to so-called "intrinsic safety". The concept "intrinsically safe" is defined by relevant standards and means that neither normal signals nor voltages possibly occurring under failure conditions should be capable of causing an ignition, even under worst case conditions. Examples of standards for intrinsic safety are IEC610079-0 and IEC610079-11. Applications that may benefit from this include, for example tank gauging and microwave communication at industry sites or gas stations, etc.

SUMMARY OF THE INVENTION

In view of the above description of the technical background, a general object of the present invention is to provide an improved microwave transmission arrangement, in particular a microwave transmission arrangement suitable for use in environments with potentially explosive atmospheres, that are subject to so-called "EX-restrictions".

According to an aspect of the present invention, it is therefore provided a microwave transmission arrangement, comprising an electrically conductive hollow waveguide configured to guide microwave signals in a predefined wavelength range in a predefined propagation mode along a signal propagation path defined by the hollow waveguide, the hollow waveguide having a first waveguide portion with a first waveguide cross-section area, a second waveguide portion between the first waveguide portion and a first end of the hollow waveguide, the second waveguide portion having a second waveguide cross-section area greater than the first waveguide cross-section area, and a conductive transition surface of the hollow waveguide forming a transition between the first waveguide portion and the second waveguide portion; and a microwave circuit board including a dielectric carrier, and a first conductor pattern on a first side of the dielectric carrier, the first conductor pattern including a patch for radiating or receiving microwave signals in the predefined wavelength range, and a first ground plane surrounding the patch, wherein the first ground plane of the microwave circuit board is in conductive contact with the first end of the hollow waveguide, and extends into the second waveguide portion cross-section area to define at least one conductive pocket together with the second waveguide portion and the transition surface of the hollow waveguide.

The first waveguide cross-section area is a plane perpendicular to the signal propagation path, and the second waveguide cross-section area is in a plane perpendicular to the signal propagation path.

That the first ground plane extends into the second waveguide portion cross-section area to define the at least one conductive pocket together with the second waveguide portion and the transition surface of the hollow waveguide should be understood to mean that the first ground plane, in addition to being in conductive contact with the first end of the hollow waveguide, is also present within the area of the first side of the microwave circuit board that is circumscribed by the hollow waveguide at the first end of the hollow waveguide. There may be a gap between the outer periphery of the patch and an edge of the first ground plane, and the first ground plane may extend from this edge and at least to the first end of the hollow waveguide, and at least partly beyond.

The present inventor has found that existing microwave transmission arrangements in which the microwave coupling to the waveguide is carried out using a patch and a ground plane at least partly surrounding the patch cannot combine an efficient microwave energy transfer with intrinsic safety. In particular, the inventor found that the distance between the patch and the hollow waveguide does not become large enough to fulfill the requirements of the relevant standards.

In view of this finding, the present invention is based on the realization that a sufficient distance between the patch and the hollow waveguide can be achieved while at the same time achieving efficient transfer of microwave energy between the patch and the hollow waveguide, by configuring the hollow waveguide and the first ground plane in such a way that at least one conductive pocket is formed at the transition between the microwave circuit board and the hollow waveguide. Through a suitable configuration of such a conductive pocket (or pockets), the distance between the patch and the hollow waveguide can be increased, while maintaining acceptable microwave energy transmission capabilities. The present inventor has also surprisingly found that the configuration with one or several conductive pocket(s) can be configured in such a way that the tolerances for positioning the microwave circuit board and the hollow waveguide in relation to each other can be increased, which facilitates cost-efficient mass-production of the microwave transmission arrangement according to embodiments of the present invention, and of systems or devices including the microwave transmission arrangement.

It should be noted that the exact configuration of the conductive pocket or pockets will typically depend on the layout of the microwave circuit board and/or the wavelength range, and that one or ordinary skill in the art will be able to arrive at a suitable conductive pocket configuration using, for example, readily available simulation tools.

According to embodiments, the transition surface of the hollow waveguide may extends at least a distance corresponding to 0.4 times a center wavelength of the predefined wavelength range in a direction perpendicular to the signal propagation path. This means that the depth of the at least one conductive pocket becomes at least a distance corresponding to 0.4 times the center wavelength of the predefined wavelength range.

Simulations have shown that such a minimum depth of the at least one conductive pocket may be advantageous for the transmission of the microwave signals from the patch to the hollow waveguide.

Furthermore, the transition surface of the hollow waveguide may advantageously extend less than a distance corresponding to 0.6 times a center wavelength of the predefined wavelength range in a direction perpendicular to the signal propagation path. This means that the depth of the at least one conductive pocket becomes less than a distance corresponding to 0.6 times the center wavelength of the predefined wavelength range.

Simulations have shown that such a maximum depth of the at least one conductive pocket may be advantageous for the transmission of the microwave signals from the patch to the hollow waveguide.

Various simulation results align well with the theory of so-called half-wavelength chokes, and confirm that the at least one conductive pocket can be configured to act as a virtual shorting wall so that the microwave signals propagating from the patch will effectively see a hollow waveguide having the first waveguide cross-section area when entering the hollow waveguide at the first end of the hollow waveguide.

According to various embodiments, the microwave transmission arrangement may further comprise microwave transceiver circuitry having an output for providing microwave signals generated by the microwave transceiver circuitry and an input for receiving microwave signals; and the patch may be connected to at least one of the output and the input.

The "transceiver" may be one functional unit capable of transmitting and receiving microwave signals, or may be a system comprising separate transmitter and receiver units.

According to embodiments, this microwave transmission arrangement may advantageously be included in a communication and/or measuring system, further comprising processing circuitry coupled to the microwave transceiver circuitry and configured to control the microwave transceiver circuitry to provide microwave signals and/or to perform signal processing on microwave signals received by the microwave transceiver circuitry.

According to one particular embodiment, this microwave transmission arrangement may advantageously be included in a radar level gauge system for determining the filling level of a product in a tank, further comprising an antenna coupled to the hollow waveguide of the microwave transmission arrangement for radiating an electromagnetic transmit signal from the microwave transmission arrangement towards a surface of the product and for returning an electromagnetic reflection signal resulting from reflection of the electromagnetic transmit signal at the surface back towards the microwave transmission arrangement; and processing circuitry coupled to the microwave transceiver circuitry comprised in the microwave transmission arrangement and configured to determine the filling level based on a timing relation between the transmit signal and the reflection signal.

For all embodiments, it should be noted that the processing circuitry may be provided as one device or several devices working together.

In summary, the present invention thus relates to a microwave transmission arrangement, comprising an electrically conductive hollow waveguide having a first waveguide portion, a second waveguide portion between the first waveguide portion and a first end of the hollow waveguide, and a conductive transition surface of the hollow waveguide forming a transition between the first waveguide portion and the second waveguide portion; and a microwave circuit board including a dielectric carrier, and a first conductor pattern on a first side of the dielectric carrier, the first conductor pattern including a patch for radiating or receiving microwave signals in the predefined wavelength range, and a first ground plane surrounding the patch, wherein the first ground plane of the microwave circuit board is in conductive contact with the first end of the hollow waveguide, and extends into the second waveguide portion cross-section area to define at least one conductive pocket together with the second waveguide portion and the transition surface of the hollow waveguide.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EXAMPLE EMBODIMENTS OF THE INVENTION

In the present detailed description, various embodiments of the microwave transmission arrangement according to the present invention are mainly discussed with reference to a radar level gauge system.

It should be noted that this by no means limits the scope of the present invention, which equally well includes, for example, microwave transmission arrangements used for other applications, such as communication systems, for example microwave links as may, for example, be used in 5G communication systems.

Figure 1:
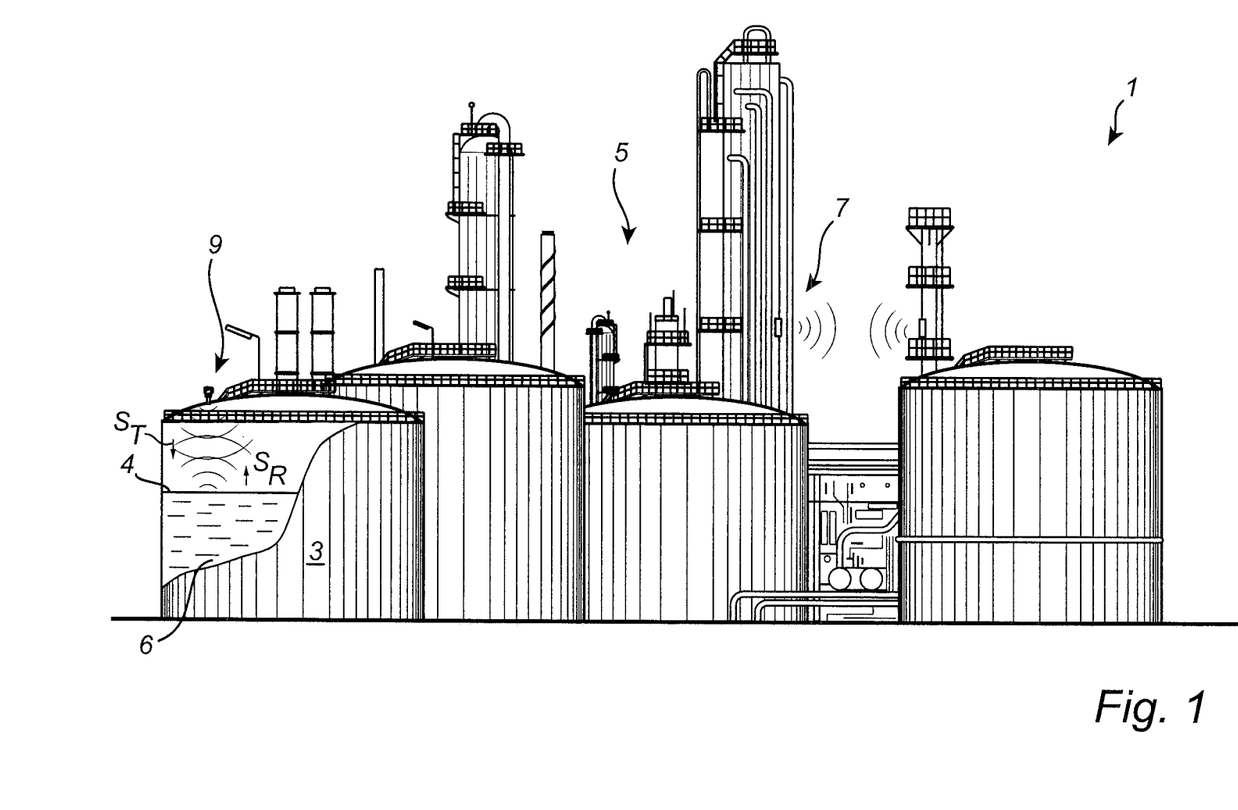
FIG. 1 schematically shows example applications of the microwave transmission arrangement according to embodiments of the present invention.

FIG. 1 schematically shows an industry site 1, such as a process industry, for example a refinery or similar. As is schematically shown in FIG. 1, the industry site 1 includes tanks 3 and various process equipment 5. Depending on the type of industry, there may be hazardous environments on the industry site 1, requiring equipment used on the site 1 to be certified according to applicable standards. Suitably, at least some of the equipment used on the site 1 may fulfill relevant requirements for intrinsic safety, meaning that the equipment is certified as not being capable of causing ignition in a hazardous environment. Examples of applicable standards for intrinsic safety are IEC610079-0 and IEC610079-11.

Examples of equipment on the industry site 1 that may advantageously be configured to fulfill requirements for intrinsic safety may include the microwave link 7 and the radar level gauge system 9 schematically indicated in FIG. 1. Common to such systems according to embodiments of the present invention is that they each include a microwave transmission arrangement for transmission of microwave signals between transceiver circuitry and an antenna. As is well known to those skilled in the relevant art, various specifications may be different for equipment used in a microwave link 7 and a radar level gauge system 9, respectively. For instance, the antenna configuration may be specifically adapted to the environment where the antenna is arranged. However, the microwave transmission arrangement used in the various applications may have substantially the same configuration.

Figure 2:
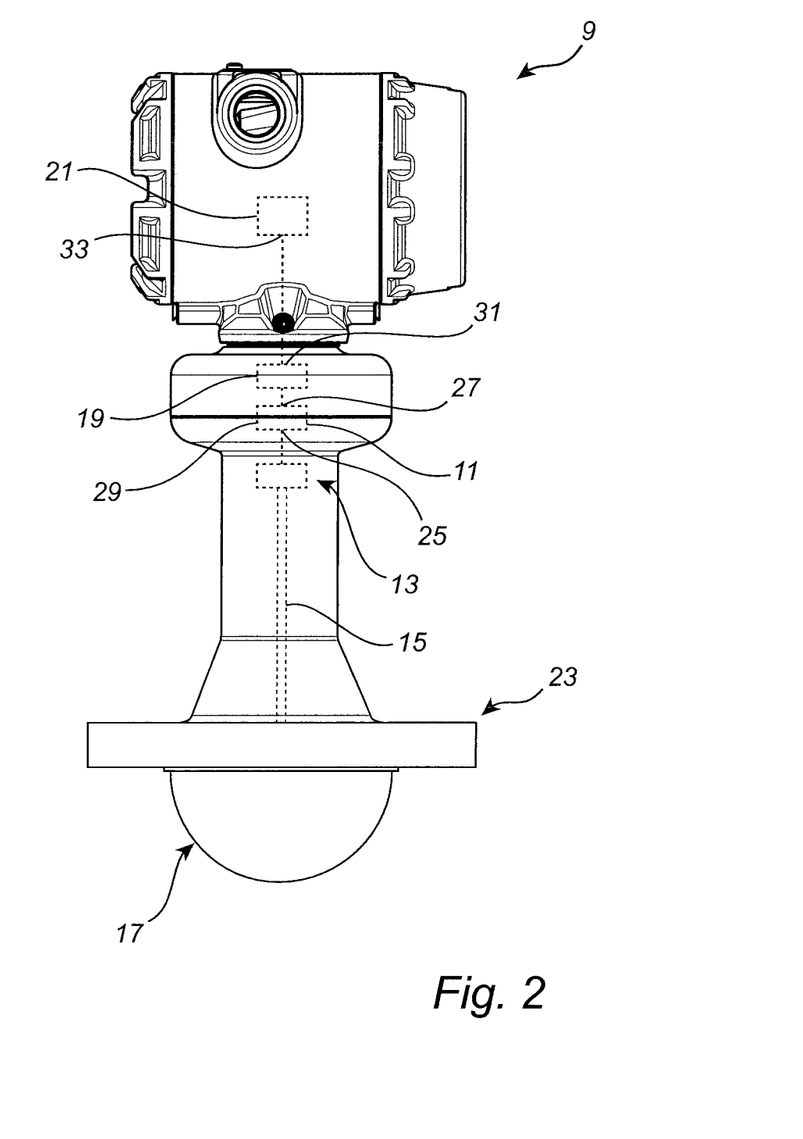
FIG. 2 is a schematic side view of one example application of the microwave transmission arrangement according to embodiments of the present invention, in the form of an exemplary radar level gauge system.

FIG. 2 is a schematic side view of one example application of the microwave transmission arrangement according to embodiments of the present invention, in the form of an exemplary radar level gauge system 9.

As is conceptually indicated in FIG. 2, the radar level gauge system 9 comprises microwave transceiver circuitry 11 a microwave transmission arrangement 13 including a hollow waveguide 15, an antenna 17, processing circuitry 19, communication circuitry 21, and a process connection, here in the form of a flange 23.

The microwave transceiver circuitry 11 has an output—here shown as a combined microwave output and input port 25—for providing microwave signals generated by the microwave transceiver circuitry 11, and an input for receiving microwave signals. As is schematically indicated in FIG. 2, the microwave transceiver circuitry 11 also has a measurement data interface 27 coupled to a corresponding measurement data interface 29 of the processing circuitry 19. The processing circuitry 19 additionally has a communication interface 31 that is coupled to a corresponding communication interface 33 of the communication circuitry 21.

In operation of the radar level gauge system 9, the processing circuitry 19 controls the microwave transceiver circuitry 11 to generate and transmit a microwave transmit signals. The microwave transmit signals are provided by the microwave transceiver circuitry 11 to the microwave transmission arrangement 13, which transitions the microwave transmit signals to the antenna 17. Referring briefly to FIG. 1, the antenna 17 (FIG. 2) radiates the microwave transmit signals $S_T$ towards a surface 4 of a product 6 in the tank 3. The microwave transmit signals $S_T$ are at least partly reflected back towards the antenna 17 as microwave reflection signals $S_R$. The microwave reflection signals $S_R$ impinge on the antenna 17, and, as shown in FIG. 2, are guided by the hollow waveguide 15 and the microwave transmission arrangement 13 transitions the microwave reflection signals $S_R$ from signals guided by the hollow waveguide 15 to signals carried by a strip-line on a microwave circuit board (not shown in FIG. 2) back to the microwave transceiver circuitry 11. Based on a timing relation between the microwave transmit signals $S_T$ and the microwave reflection signals $S_R$, the processing circuitry 19 determines the filling level of the product 6 in the tank 3 in a, per se, well-known manner. A communication signal indicative of the determined filling level is communicated to an external host by the communication circuitry 21.

In the microwave link 7, there may be no determination of a distance, but instead data may be encoded on a transmitted signal, and data may be retrieved by decoding a received signal, in ways well-known to those skilled in the relevant art.

Figure 3A:
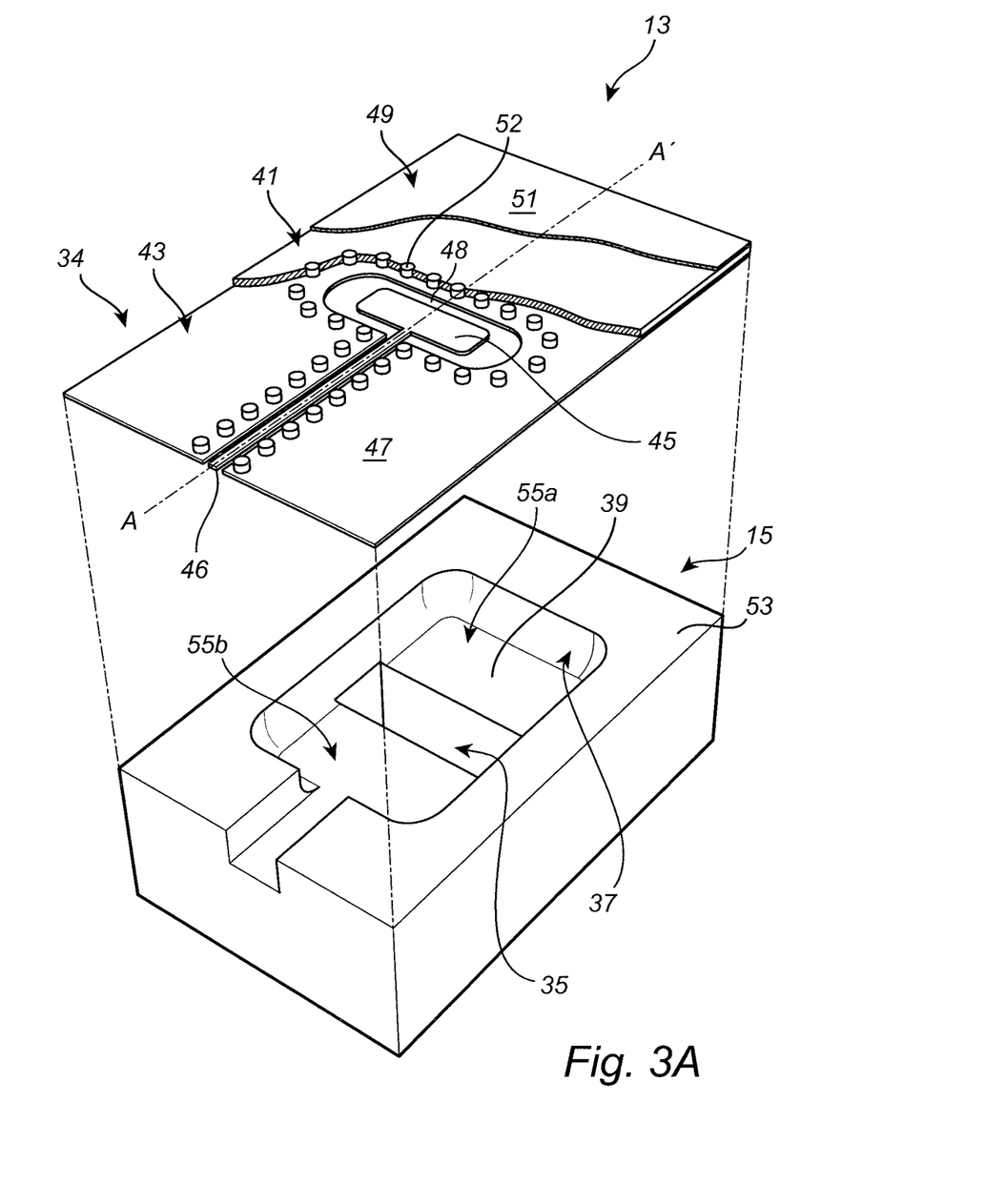
FIGS. 3A, 3B and 3C schematically illustrate a microwave transmission arrangement according to example embodiments of the present invention.
Figure 3B:
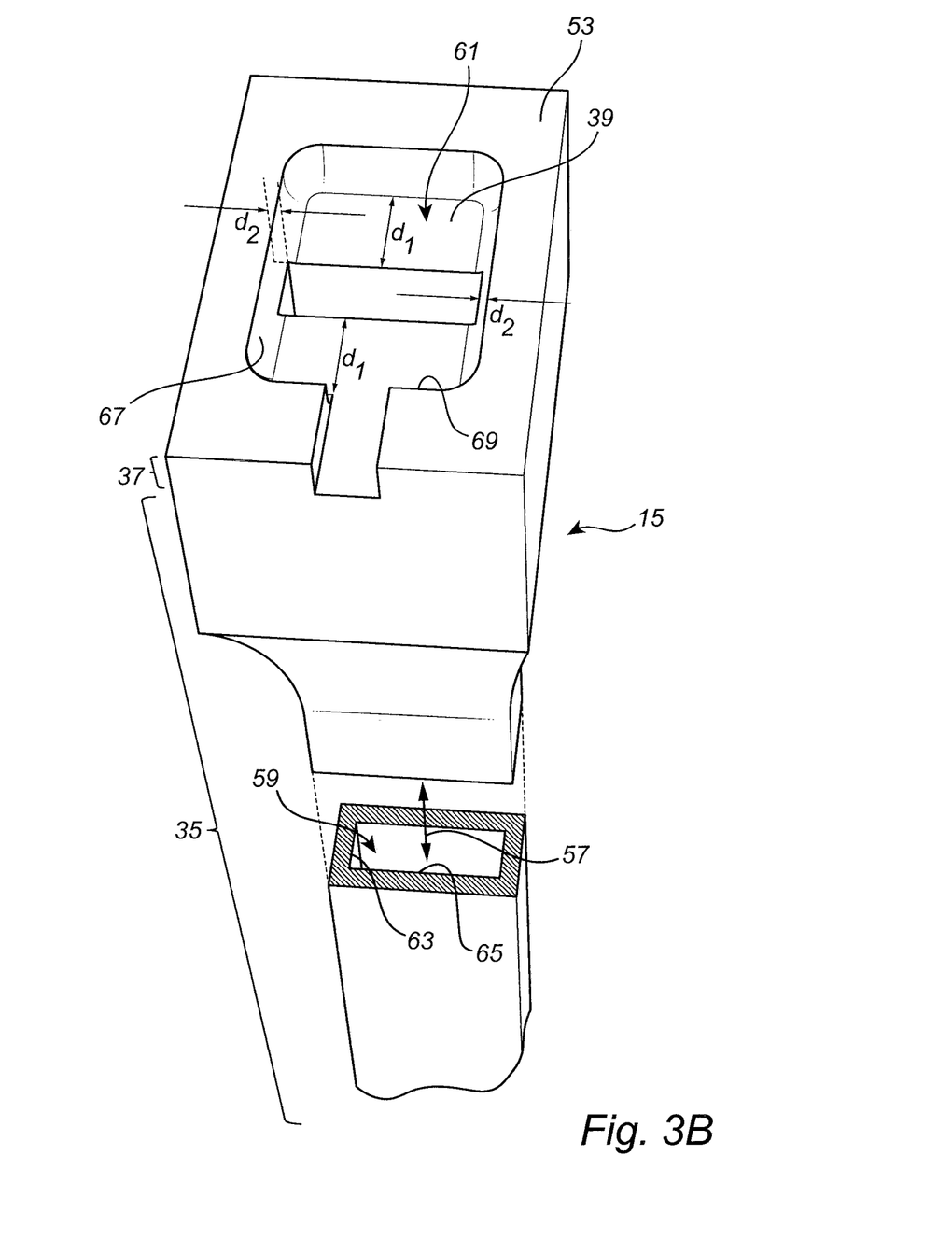
Figure 3C:
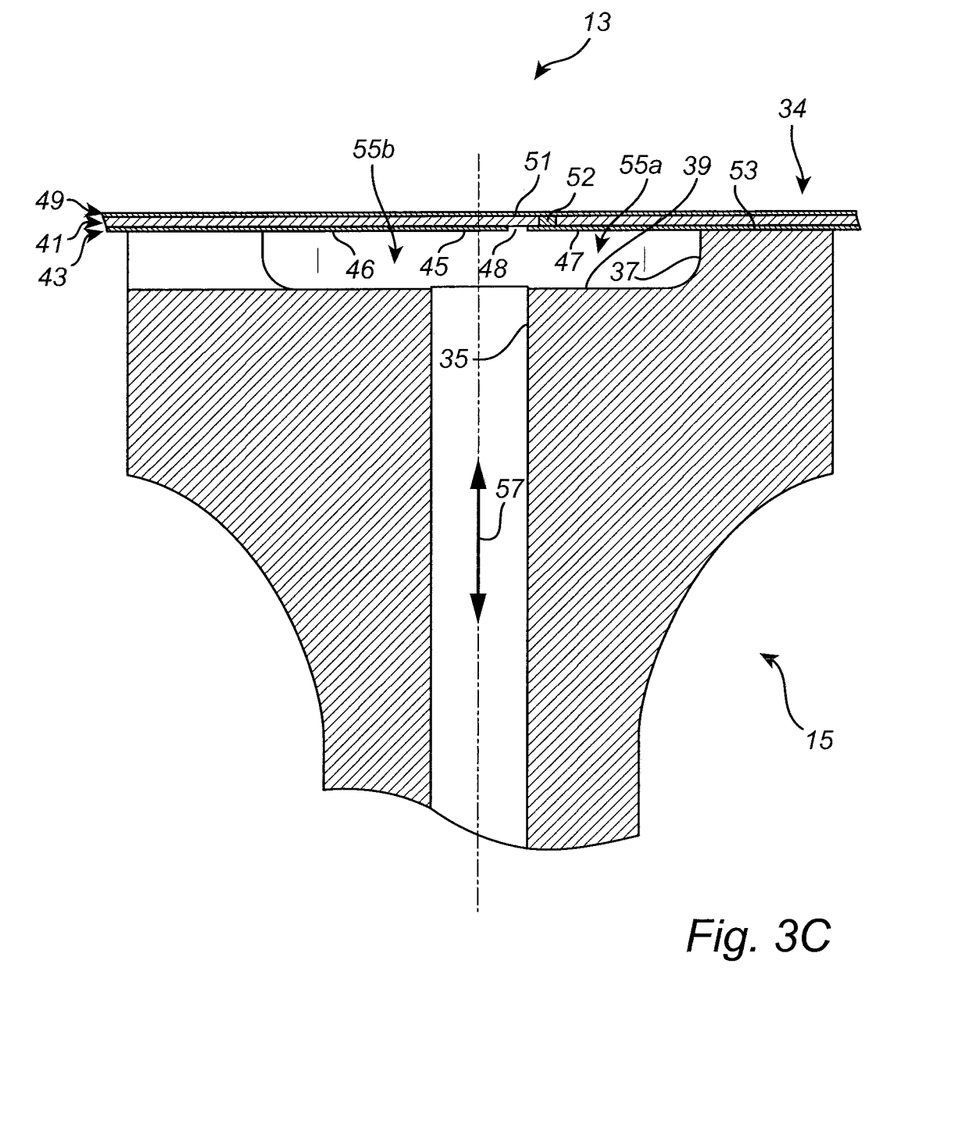

FIGS. 3A, 3B and 3C schematically illustrate a microwave transmission arrangement 13 according to example embodiments of the present invention. The microwave transmission arrangement 13 of the kind schematically shown in FIGS. 3A and 3C may be used in various systems, such as the microwave link 7 and the radar level gauge system 9 in FIG. 1.

Referring first to FIG. 3A, which is an exploded view of the microwave transmission arrangement 13, the microwave transmission arrangement 13 comprises an electrically conductive hollow waveguide 15, and a microwave circuit board 34. The hollow waveguide 15 is configured to guide microwave signals in a predefined wavelength range, in a predefined propagation mode along a signal propagation path defined by the hollow waveguide 15. The predefined wavelength range may, for example, correspond to the frequency range 77 GHz-81 GHz, and the predefined propagation mode may, for example, be TE10, but other wavelength ranges and/or propagation modes are possible and may be beneficial depending on the application.

As is indicated in FIG. 3A, but better shown in FIG. 3B, the hollow waveguide 15 has a first waveguide portion 35 with a first waveguide cross-section area and a second waveguide portion 37 with a second waveguide cross-section area, greater than the first waveguide cross-section area. The first waveguide portion 35 and the second waveguide portion 37 are connected by a conductive transition surface 39 of the hollow waveguide 15. In the example configuration of the microwave transmission arrangement 13 in FIGS. 3A and 3C, the hollow waveguide 15 has a substantially rectangular cross-section (or rather two different substantially rectangular cross-sections). It should, however, be noted that the hollow waveguide 15 may have another cross-section, such as a circular or elliptical cross-section.

The microwave circuit board 34 comprises a dielectric carrier 41, and a first conductor pattern 43 on a first side of the microwave circuit board 34 facing the hollow waveguide 15. As is schematically indicated in FIGS. 3A and 3C, the first conductor pattern 43 includes a patch 45 and a first ground plane 47 at least partly surrounding the patch 45. A microwave strip-line 46 connects the patch 45 with the microwave circuitry 19 (not shown in FIG. 3A). As is schematically indicated in FIG. 3A, the first ground plane 47 substantially entirely surrounds the patch 45 and the microwave strip-line 46. There is a gap 48 in the first conductor pattern 43 separating the patch 45 and the first ground plane 47. The patch 45 is here shown as being substantially rectangular, because the patch 45 is adapted to the hollow waveguide 15. For other waveguide configurations, other patch configurations may be suitable, as will be understood to those skilled in the relevant art.

In the example configuration in FIG. 3A, the microwave circuit board 34 additionally has a second conductor pattern 49 on a second side of the dielectric carrier 41, opposite the first side. The second conductor pattern 49 includes a second ground plane 51 arranged opposite the patch 45 and the first ground plane 47. As is schematically shown in FIG. 3A, the first ground plane 47 and the second ground plane 51 are interconnected by electrically conducting vias 52 extending through the dielectric carrier 41.

As is schematically indicated in FIG. 3A, the first end 53 of the electrically conductive hollow waveguide 15 is in electrically conductive contact with the first ground plane 47 of the microwave circuit board 34. Furthermore, as can also be seen in FIG. 3A, the first ground plane 47 extends into the second waveguide portion cross-section area to define conductive pockets 55a and 55b together with the second waveguide portion 37 (the conductive side wall of the second waveguide portion 37) and the transition surface 39 of the hollow waveguide 15. The conductive pockets 55a and 55b are thus receptacles with conductive walls.

In particular the hollow waveguide 15 of the microwave transmission arrangement 13 will now be described in more detail with reference to the schematic perspective view in FIG. 3B.

Referring to FIG. 3B, the signal propagation path 57 defined by the hollow waveguide 15 is schematically indicated. As mentioned further above, the first waveguide portion 35 has a first waveguide cross-section area 59 in a cross-section with a plane perpendicular to the signal propagation path 57, and the second waveguide portion 37 has a second waveguide cross-section area 61 in a cross-section with a plane perpendicular to the signal propagation path 57.

The distance along the signal propagation path 57 from the first end 53 of the hollow waveguide 15 to the conductive transition surface 39 of the hollow waveguide 15, or the depth of the second waveguide portion 37 may advantageously be more than 0.2 mm and less than 2 mm. The minimum depth is selected to ensure that the microwave transmission arrangement 13 fulfills relevant requirements for intrinsic safety, and the maximum depth is selected for efficient transmission of microwave energy between the patch 45 and the first waveguide portion 35 of the hollow waveguide 15.

Furthermore, the transition surface 39 may advantageously extend a distance $d_1$, in at least one direction perpendicular to the signal propagation path 57, corresponding to 0.4-0.6 times a center wavelength of the predefined wavelength range for which the microwave transmission arrangement 13 is configured.

In the example configuration of FIG. 3B, the first waveguide portion 35 has a rectangular cross-section with a first side 63 and a second side 65 perpendicular to the first side 63. The second waveguide portion 37 also has a rectangular cross-section with a first side 67 parallel to the first side 63 of the first waveguide portion 35 and a second side 69 parallel to the second side 65 of the first waveguide portion 35.

In this particular configuration, it has been found that the first 67 side of the second waveguide portion 37 may advantageously be longer than the first side 63 of the first waveguide portion 35 by at least a distance corresponding to 0.8 times a center wavelength of the predefined wavelength range, and a difference between a length of the second side 69 of the second waveguide portion 37 and a length of the second side 65 of the first waveguide portion 35 may be less than a distance corresponding to 0.4 times a center wavelength of the predefined wavelength range. For example, the transition surface 39 may advantageously extend a distance $d_2$, in at least one direction perpendicular to the signal propagation path 57, corresponding to less than 0.2 times a center wavelength of the predefined wavelength range for which the microwave transmission arrangement 13 (FIG. 2) is configured. The reason for this is to prevent the formation of additional propagation modes in the microwave transmission arrangement 13. According to embodiments, the distance $d_2$ may advantageously be close to zero, so that the length of the second side 69 of the second waveguide portion 37 is substantially equal to the length of the second side 65 of the first waveguide portion 35.

FIG. 3C is a schematic side view of a cross-section of the microwave transmission arrangement 13 in FIG. 3A taken along the line A-A' in FIG. 3A. The side view in FIG. 3C shows the same structure as that described above with reference to FIG. 3A, and more clearly shows the first conductor pattern 43 and the second conductor pattern 49 of the microwave circuit board 34, and in particular clearly indicates the first conductive pocket 55a and the second conductive pocket 55b defined by the first ground plane 47, the second waveguide portion 37, and the transition surface 39 of the hollow waveguide 15.

The person skilled in the art realizes that the present invention by no means is limited to the preferred embodiments described above. On the contrary, many modifications and variations are possible within the scope of the appended claims.

What is claimed is:

1. A microwave transmission arrangement, comprising:
   an electrically conductive hollow waveguide configured to guide microwave signals in a predefined wavelength range in a predefined propagation mode along a signal propagation path defined by the hollow waveguide, the hollow waveguide having a first waveguide portion with a first waveguide cross-section area, a second waveguide portion between the first waveguide portion and a first end of the hollow waveguide, the second waveguide portion having a second waveguide cross-section area greater than the first waveguide cross-section area, and a conductive transition surface of the hollow waveguide forming a transition between the first waveguide portion and the second waveguide portion; and
   a microwave circuit board including a dielectric carrier, and a first conductor pattern on a first side of the dielectric carrier, the first conductor pattern including a patch for radiating or receiving microwave signals in the predefined wavelength range, and a first ground plane surrounding the patch,
   wherein the first ground plane of the microwave circuit board is in conductive contact with the first end of the hollow waveguide, and extends into the second waveguide portion cross-section area, so that the first ground plane is present within an area of the microwave circuit board that is circumscribed by the hollow waveguide at the first end of the hollow waveguide.

2. The microwave transmission arrangement according to claim 1, wherein a minimum distance between the patch and the hollow waveguide is at least 0.2 mm.

3. The microwave transmission arrangement according to claim 2, wherein the second waveguide portion extends more than 0.2 mm and less than 2 mm from the first end of the hollow waveguide along the along the signal propagation path.

4. The microwave transmission arrangement according to claim 1, wherein the transition surface extends at least a distance corresponding to 0.4 times a center wavelength of the predefined wavelength range in a direction perpendicular to the signal propagation path.

5. The microwave transmission arrangement according to claim 1, wherein the transition surface extends less than a distance corresponding to 0.6 times a center wavelength of the predefined wavelength range in a direction perpendicular to the signal propagation path.

6. The microwave transmission arrangement according to claim 1, wherein:
the first waveguide portion has a rectangular cross-section with a first side and a second side perpendicular to the first side; and
the second waveguide portion has a rectangular cross-section with a first side parallel to the first side of the first waveguide portion and a second side parallel to the second side of the first waveguide portion.

7. The microwave transmission arrangement according to claim 6, wherein:
the first side of the second waveguide portion is longer than the first side of the first waveguide portion by at least a distance corresponding to 0.8 times a center wavelength of the predefined wavelength range; and
a difference between a length of the second side of the second waveguide portion and a length of the second side of the first waveguide portion is less than a distance corresponding to 0.4 times a center wavelength of the predefined wavelength range.

8. The microwave transmission arrangement according to claim 7, wherein the length of the second side of the second waveguide portion is substantially equal to the length of the second side of the first waveguide portion.

9. The microwave transmission arrangement according to claim 1, wherein the microwave circuit board has a second conductor pattern on a second side of the dielectric carrier, opposite the first side, the second conductor pattern including a second ground plane arranged opposite the patch and the first ground plane, wherein the first ground plane and the second ground plane are interconnected by electrically conducting vias extending through the dielectric carrier.

10. The microwave transmission arrangement according to claim 1, wherein:
the microwave transmission arrangement further comprises microwave transceiver circuitry having an output for providing microwave signals generated by the microwave transceiver circuitry and an input for receiving microwave signals; and
the patch is connected to at least one of the output and the input.

11. A communication and/or measurement system comprising:
the microwave transmission arrangement according to claim 10; and
processing circuitry coupled to the microwave transceiver circuitry and configured to control the microwave transceiver circuitry to provide microwave signals and/or to perform signal processing on microwave signals received by the microwave transceiver circuitry.

12. A radar level gauge system for determining the filling level of a product in a tank, comprising:
the microwave transmission arrangement according to claim 10;
an antenna coupled to the hollow waveguide of the microwave transmission arrangement for radiating an electromagnetic transmit signal from the microwave transmission arrangement towards a surface of the product and for returning an electromagnetic reflection signal resulting from reflection of the electromagnetic transmit signal at the surface back towards the microwave transmission arrangement; and
processing circuitry coupled to the microwave transceiver circuitry comprised in the microwave transmission arrangement and configured to determine the filling level based on a timing relation between the transmit signal and the reflection signal.

* * * * *